(12) United States Patent
Yamakawa et al.

(10) Patent No.: US 7,572,321 B2
(45) Date of Patent: Aug. 11, 2009

(54) MEMBRANE, METHOD OF MAKING SAME AND HEAT EXCHANGER FURNISHED WITH SAID MEMBRANE

(75) Inventors: Keiichi Yamakawa, Akaiwa-gun (JP); Takashi Imai, Wake-gun (JP)

(73) Assignee: Japan Gore-Tex, Inc., Tokyo (JP)

( * ) Notice: Subject to any disclaimer, the term of this patent is extended or adjusted under 35 U.S.C. 154(b) by 402 days.

(21) Appl. No.: 11/265,755

(22) Filed: Nov. 1, 2005

(65) Prior Publication Data

US 2006/0090650 A1      May 4, 2006

(30) Foreign Application Priority Data

Nov. 1, 2004   (JP) .............................. 2004-318033
Dec. 8, 2004   (JP) .............................. 2004-355338

(51) Int. Cl.
*B01D 53/22* (2006.01)
(52) U.S. Cl. ................... 96/11; 96/4; 96/12; 96/13; 96/14; 95/52; 55/DIG. 5; 210/640; 210/500.27; 210/500.28; 165/60; 261/158; 427/372.2; 427/407.1; 427/412.1
(58) Field of Classification Search .............. 96/4, 96/11, 12, 13, 14; 95/45, 52; 55/DIG. 5; 210/640, 650, 490, 500.21, 500.27, 500.28; 165/60; 261/158; 427/331, 372.2, 407.1, 427/412.1; 156/60
See application file for complete search history.

(56) References Cited

U.S. PATENT DOCUMENTS 4,215,160 A * 7/1980 Rosenberg et al. .......... 427/177
4,344,999 A * 8/1982 Gohlke .......................... 128/849
4,871,378 A * 10/1989 Pinnau ............................ 95/52
4,938,778 A * 7/1990 Ohyabu et al. ............ 210/500.23
4,963,165 A * 10/1990 Blume et al. .................. 96/12
5,015,268 A * 5/1991 Ho ................................ 96/14
5,019,422 A * 5/1991 Rose et al. ..................... 96/12
5,082,472 A * 1/1992 Mallouk et al. ............... 96/12

(Continued)

FOREIGN PATENT DOCUMENTS

EP          0 661 502 A2 * 7/1995

(Continued)

*Primary Examiner*—Jason M Greene
(74) *Attorney, Agent, or Firm*—Richard W. Ellis

(57) ABSTRACT

A membrane 12 that exhibits superior condensation resistance regardless of the type of moisture-permeable resin, that has satisfactory adhesion between a porous film and a reinforcing member, and that can be manufactured in a simple manner.

The membrane 12 is a laminated article 23 containing a porous film 20 and a reinforcing member 40, and the reinforcing member 40 has a moisture-permeable resin layer 30 on the side of an interface 50 with the porous film 20. To reliably form the moisture-permeable resin layer (moisture-permeable resin film) 30, the average pore diameter of the porous film 20 is preferably 0.01 to 10 μm, and the porosity of the reinforcing member 40 is preferably 30 to 95%. According to the membrane 12 of the present invention, even if the moisture-permeable resin is water-soluble (for example, polyvinyl alcohol), condensation resistance is still satisfactory. If the difference between the critical surface tension $\gamma_{c2}$ of the reinforcing member 40 and the critical surface tension $\gamma_{c1}$ of the porous film 20 ($\gamma_{c2}-\gamma_{c1}$) is set in advance to −5 mN/m or greater, the moisture-permeable resin layer 30 can be disposed internally at a specific location.

15 Claims, 3 Drawing Sheets

U.S. PATENT DOCUMENTS

| | | | |
|---|---|---|---|
| 5,938,874 A * | 8/1999 | Palomo et al. | 156/73.1 |
| 6,071,834 A * | 6/2000 | Martz | 210/500.27 |
| 6,254,978 B1 | 7/2001 | Bahar et al. | |
| 6,409,787 B1 * | 6/2002 | Smithies et al. | 96/13 |
| 7,114,621 B2 * | 10/2006 | Hester et al. | 210/490 |
| 2007/0190166 A1 * | 8/2007 | Howard et al. | 424/538 |

FOREIGN PATENT DOCUMENTS

| | | |
|---|---|---|
| EP | 0661502 | 7/1995 |
| EP | 1291585 | 3/2003 |
| JP | 56030595 | 3/1981 |

* cited by examiner

[Figure 1]
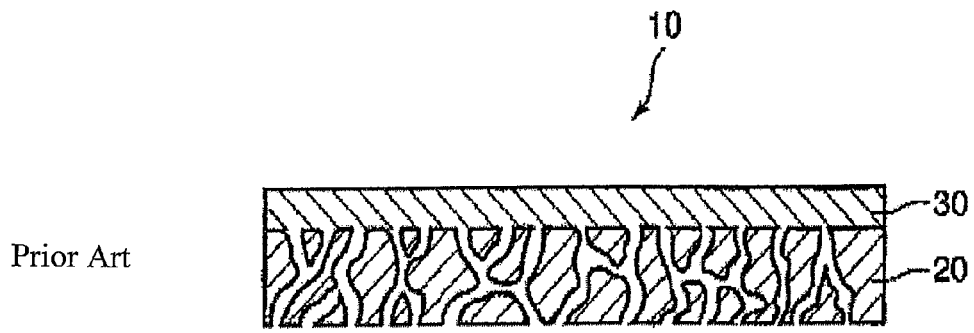
Prior Art
[Figure 2]
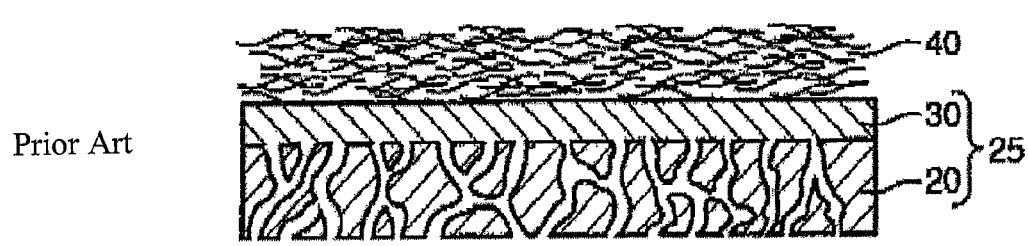
Prior Art
[Figure 3]
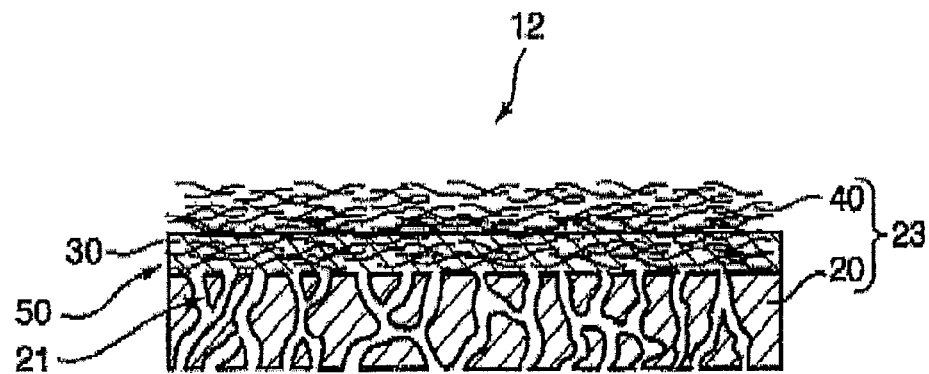

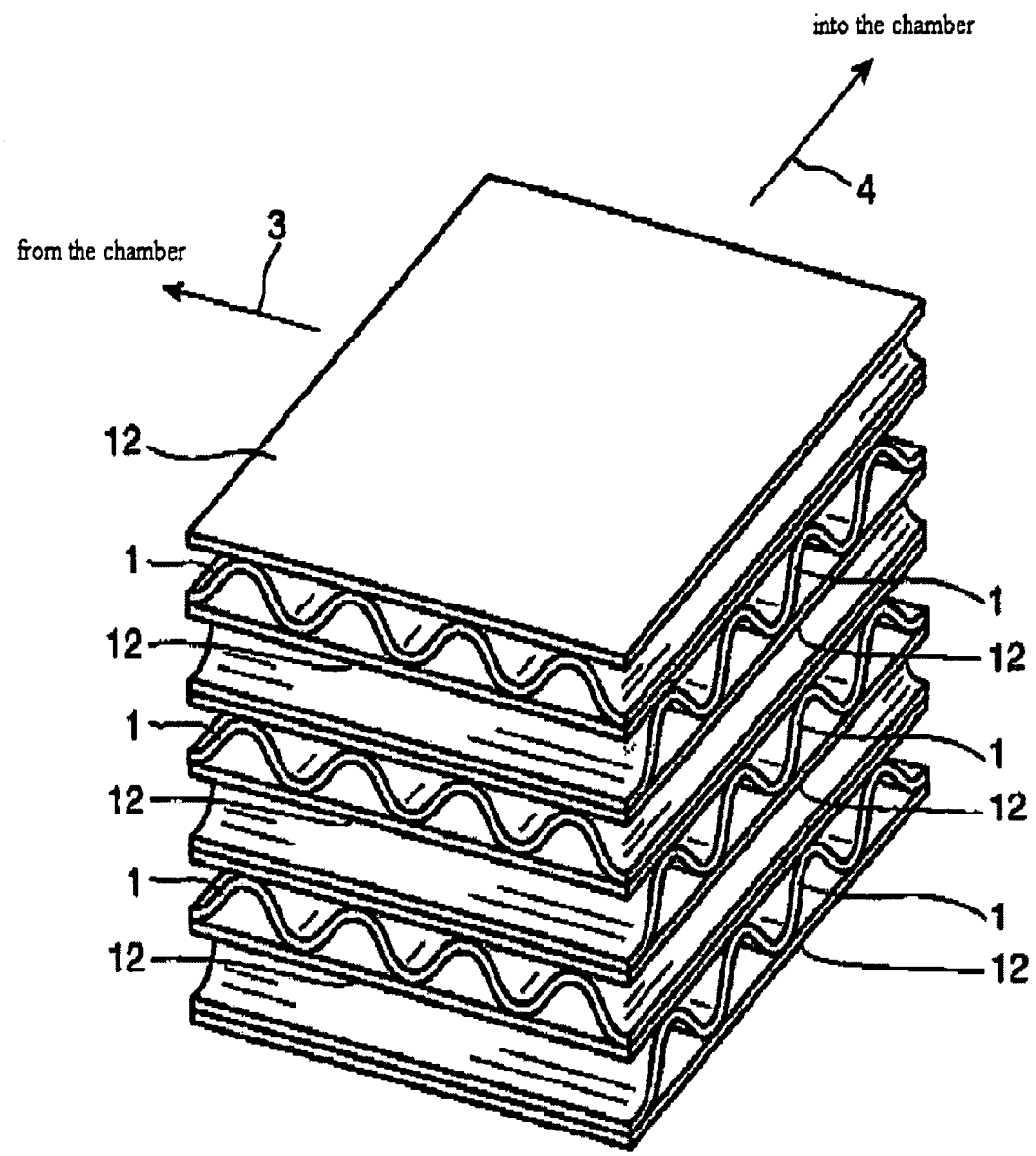

MEMBRANE, METHOD OF MAKING SAME AND HEAT EXCHANGER FURNISHED WITH SAID MEMBRANE

BACKGROUND OF THE INVENTION

The present invention relates to a membrane with low air permeability, yet having good moisture permeability. This membrane is used for various applications such as heat exchanger membranes, humidifier membranes, dehumidifier membranes, pervaporation membranes (membranes for separating water from other liquids, such as ethanol, for example), and the like.

Heat exchanger membranes are a typical application for membranes. Heat exchanger membranes are utilized, for example, in air conditioning systems, and can allow heat exchange without mixing of inside and outside air. In recent years, there have been proposed total heat exchanger membranes that exchange not just heat but humidity as well. Preferably, such heat exchanger membranes will have low air permeability, yet have good moisture permeability.

In FIG. 1, shows a prior art heat exchanger membrane 10 of double-layer construction, composed of a cured moisture-permeable resin layer 30 disposed on a polymer resin porous sheet 20. Reinforcing the heat exchanger membrane 10 has also been proposed. As shown in FIG. 2, for example, there is shown a heat exchanger membrane 11 of triple-layer construction having an additional reinforcing member 40 disposed on the cured moisture-permeable resin layer 30. These heat exchanger membranes 10, 11 exhibit low air permeability and good moisture permeability, and are also resistant to condensation, loss of shape, growth of mildew, and the like, giving them extended service life. While Ppolyvinyl alcohol subjected to at least partial crosslinking has been proposed as an exemplary moisture-permeable resin, polyurethane resins, silicone resins, fluororesins and the like were actually used as moisture-permeable resin in Working Examples.

As a result, it has been discovered that while the heat exchanger membrane of the prior art afford excellent anti-condensation properties, these anti-condensation properties are diminished when certain moisture-permeable resins (e.g., polyvinyl alcohol, etc.) are used. With the double-layer heat exchanger membrane 10 in particular, it was found that since the moisture-permeable resin layer 30 lies exposed on the surface of the heat exchanger membrane, if the moisture-permeable resin 30 per se has low water resistance, the moisture-permeable resin will tend to become washed away by water droplets forming through condensation. Even where the moisture-permeable resin layer 30 is covered by the reinforcing member 40, as in the triple-layer structure (see heat exchanger membrane 11 in FIG. 2), where certain moisture-permeable resins (e.g., polyvinyl alcohol etc.) are used, the moisture-permeable resin can dissolve, resulting in pinholes forming in the moisture-permeable resin layer 30 or in diminished bonding strength between the moisture-permeable resin layer 30 and the reinforcing member 40, so that anti-condensation properties are not satisfactory. Additionally, where the triple-layer structure is employed, since the polymer resin porous sheet 20 and the reinforcing member 40 are laminated together via the cured moisture-permeable resin layer 30, bonding between the polymer resin porous sheet 20 and the reinforcing member 40 cannot be considered to be good, and delamination sometimes occurs when subjected to external force.

SUMMARY OF THE INVENTION

In one aspect, the invention provides a membrane which is a laminated article of a porous film and reinforcing member. The reinforcing member has internally disposed therein a moisture-permeable resin layer, situated on the side of interface with the porous film. In this aspect, the membrane may have a mean pore size of 0.07 to 10 μm, and porosity of the reinforcing member is 30 to 95%.

In another aspect, the membrane according to the present invention includes a water-soluble moisture-permeable resin is. The moisture permeable membrane may be polyvinyl alcohol.

In yet another aspect, the membrane is characterized in that the difference $(\gamma_{c2}-\gamma_{c1})$ between the critical surface tension $\gamma_{c2}$ of the reinforcing member and the critical surface tension $\gamma_{c1}$ of the porous film is −5 mN/m or above.

DESCRIPTION OF THE DRAWINGS

FIG. 1 Schematic diagram showing a cut-away view of a conventional membrane;

FIG. 2 Schematic diagram showing a cut-away view of another conventional membrane;

FIG. 3 Schematic diagram showing a cut-away view of the membrane of the present invention;

FIG. 4 Oblique schematic diagram showing an example of a heat-exchanger in which the membrane of the present invention is used.

DETAILED DESCRIPTION OF THE INVENTION

Figure 5:
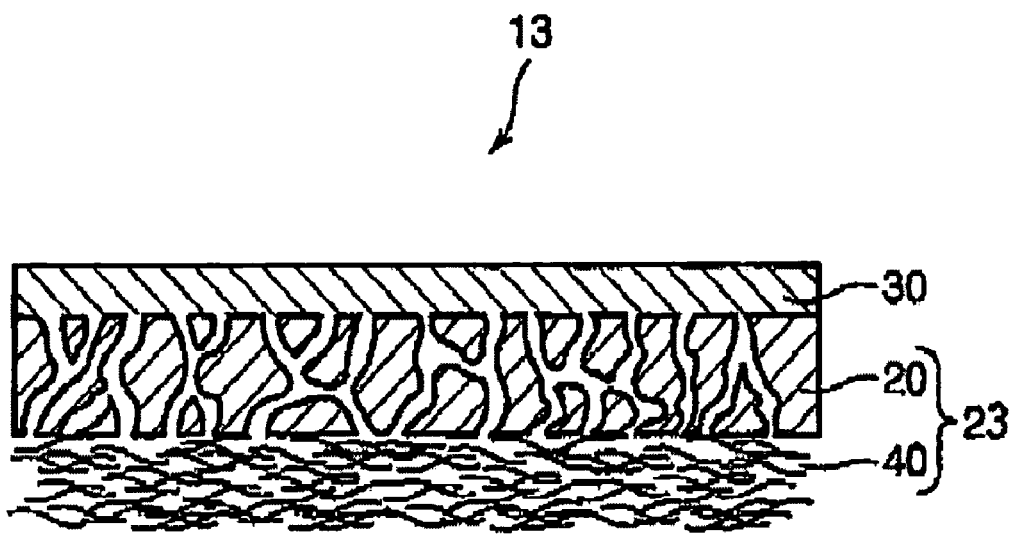
FIG. 5 Schematic diagram showing a cut-away view of the membrane of Comparative Example 1.

With the foregoing in view, it is an object of the present invention to provide a membrane that, regardless of the type of moisture-permeable resin used, exhibits outstanding anti-condensation properties, as well as good bonding of the porous film and the reinforcing member in cases where a reinforcing member is used; a method for making the membrane; and a heat exchanger furnished with the membrane.

The inventors conducted intensive research towards the goals of reducing outflow of the moisture-permeable resin caused by condensation forming on the membrane, and increasing bonding between the porous film and the reinforcing member. As a result, it was discovered that where the moisture-permeable resin layer is situated internally within the reinforcing member 40 and on the side of the interface 50 with the porous film 20 as depicted in FIG. 3, it is possible not only to directly bond together the porous film 20 and the reinforcing member 40 (including by thermal bonding), but also to appreciably reduce the extent of outflow of the moisture-permeable resin even if condensation should form on the membrane 12; They have also discovered that the bonding strength (peel strength) and anti-condensation properties can be improved at the same time and that such a membrane 12 can be manufactured easily by laminating the porous film 20 and the reinforcing member 40 together directly, then applying a mixed solution of moisture-permeable resin and solvent thereto from the reinforcing member 40 side, and then evaporating the solvent. The present invention was perfected on the basis of this discovery.

Specifically, the invention resides in a membrane 12 which is a laminated article 23 of a porous film 20 and reinforcing member 40, wherein the reinforcing member 40 has internally disposed therein a moisture-permeable resin layer 30 situated on the side of the interface 50 with the porous film 20.

For reliable formation of the moisture-permeable resin layer (moisture-permeable resin film) 30, in preferred practice, mean pore size of the porous film 20 will be 0.07 to 10 μm, and porosity of the reinforcing member 40 will be 30 to 95%. With the membrane 12 of the present invention, anti-condensation properties are good even where water soluble resin (e.g., polyvinyl alcohol, etc.) is used as the moisture-permeable resin. Where the difference ($\gamma_{c2}-\gamma_{c1}$) is between the critical surface tension $\gamma_{c2}$ of the reinforcing member 40 and the critical surface tension $\gamma_{c1}$ of the porous film 20 is −5 mN/m or above, it becomes easier for the moisture-permeable resin layer 30 to be disposed internally at the specific location mentioned above.

It is recommended that in the membrane 12 of the invention, the moisture-permeable resin layer 30 contain a flame retardant, with a view to improving flame retardancy. Also, it is preferable for the moisture-permeable resin layer 30 to contain a hygroscopic agent in order to raise the moisture permeability of the membrane 12.

Fibrous resins (e.g., nonwoven fabrics) can be given as examples of the reinforcing member 40. In preferred practice, the fibrous resin will be composed of fibers of core-sheath structure, with the melting point of the resin constituting the sheath portion being lower than the melting point of the resin constituting the core portion.

In preferred practice, the porous film 20 will be composed of polytetrafluoroethylene.

The membrane 12 of the invention has air permeability of 3000 sec or higher, for example, and moisture permeability of 3000 g/m$^2$/24 hr or higher, for example.

The membrane 12 according to the invention can be manufactured easily, by first laminating the porous film 20 and the reinforcing material 40, then applying a mixed solution of moisture-permeable resin and solvent from the reinforcing material 40 side, and evaporating out the solvent.

A heat exchanger furnished with the aforementioned membrane 12 as a constituent element also falls within the scope of the invention.

Herein, the terms "film", "sheet", and "membrane" are not intended to make distinctions as to the thickness of these materials.

In the membrane 12 of the invention, the reinforcing member 40 has a moisture-permeable resin layer 30 (moisture-permeable resin film) internally disposed therein and situated on the side of the interface 50 with the porous film 20. That is, the moisture-permeable resin is disposed internally, filling the voids within the reinforcing member 40 while remaining concealed at the side of the interface 50 with the porous film, and forming the moisture-permeable resin layer (moisture-permeable resin film) 30. Thus, even if the moisture-permeable resin should dissolve in condensation forming on the membrane 12, the moisture-permeable resin will not readily flow out due to being enveloped within the reinforcing member 40; and even if dissolved moisture-permeable resin should be repelled off the surface of the porous film 20, it will not readily bead, so that pinholes are unlikely to form. Additionally, where the moisture-permeable resin layer (moisture-permeable resin film) is internally disposed in the reinforcing member 40 situated on the side of the interface 50 with the porous film 20, since the reinforcing member 40 and the porous film 20 can now be bonded directly to one another, stronger bonding between the porous film 20 and the reinforcing member 40 can be achieved. This membrane 12 can be manufactured by means of a simple method, namely, by laminating the porous film 20 and the reinforcing material 40, then applying a mixed solution of moisture-permeable resin and solvent from the reinforcing material 40 side.

The reinforcing member employed in the invention contains voids; while the description hereinbelow takes the example of a reinforcing member in which these voids are formed by fibers (fibrous reinforcing member), reinforcing members in which voids are formed by means other than fibers differ only in the method of void formation, and may be employed in the same manner as would a fibrous reinforcing member.

The membrane 12 according to the invention is illustrated in FIG. 3. In the membrane 12 of the invention, while the moisture-permeable resin layer 30 is of film form, preserving a structure contacting the porous film 20, the moisture-permeable resin layer 30 is not simply sandwiched between the porous film 20 and the reinforcing member 40 in a triple-layer structure; rather, the moisture-permeable resin layer 30 is internally disposed within the reinforcing member 40 towards the side of the interface 50 with the porous film. Specifically, the moisture-permeable resin layer 30 is disposed internally, filling the voids between the fibers that make up the reinforcing member 40, while remaining concealed at the side of the interface 50 with the porous film 20. Thus, the moisture-permeable resin resists outflow due to condensation.

With a membrane 10 of double-layer structure composed of a moisture-permeable resin layer 30 laminated to the surface of a porous film 20 (see FIG. 1) as taught in the prior art, for example, since the moisture-permeable resin layer 30 lies exposed at the surface, condensed water flows over the surface of the moisture-permeable resin layer 30, and particularly in cases where a water-soluble moisture-permeable resin such as polyvinyl alcohol has been used, the moisture-permeable resin tends to dissolve out easily. Even where a triple-layer structure is employed, with a membrane 11 having a simple "reinforcing member 40/moisture-permeable resin layer 30/porous film 20" triple-layer structure (see FIG. 2), the effect of preventing outflow of the moisture-permeable resin layer 30 due to condensed water is insufficient. In contrast, with the membrane 12 of the present invention wherein the moisture-permeable resin layer (moisture-permeable resin film) 30 is composed of moisture-permeable resin that fills the voids between the fibers that make up the reinforcing member 40 (see FIG. 3), the flow of the moisture-permeable resin is obstructed by the fibers, so that durability against condensation is markedly improved.

Additionally, in the reinforcing member 40 of the membrane 12 according to the invention, the moisture-permeable resin layer 30 is disposed internally towards the side of the interface 50, whereby direct lamination to the porous film 20 is possible. Thus, the reinforcing member 40 and the porous film 20 can be bonded directly (including by thermal bonding) without hindrance by the moisture-permeable resin layer 30, to produce higher bonding (peel resistance) between the porous film 20 and the reinforcing member 40.

The membrane 12 herein can be manufactured by means of a simple method; namely, by laminating the porous film 20 and the reinforcing material 40, then applying a mixed solution of moisture-permeable resin and solvent from the reinforcing material 40 side, and then evaporating out the solvent. That is, once the mixed solution has been applied from the reinforcing material 40 side and has penetrated into the reinforcing member, it is dammed in by the surface of the porous film 20. In this state, by then evaporating out the solvent, the moisture-permeable resin layer (moisture-permeable resin film) 30 is formed at the specified location.

The porous film serves as the base material for the membrane; the particular type of resin composing the porous film is not critical provided that it is air permeable. More specifically, materials with heat- and corrosion-resistance are preferred, examples being polyethylene, polypropylene, and other polyolefins, as well as polycarbonate, polystyrene, polyvinyl chloride, polyvinylidene chloride, polyester, polytetrafluoroethylene, tetrafluoroethylene/hexafluoropropylene copolymers, polyvinyl fluoride, polyvinylidene fluoride, and other fluororesins. Of the above, the fluororesins are recommended for their excellent heat- and corrosion-resistance, and very low critical surface tension.

When the porous film 20 and the reinforcing member 40 are laminated, they are preferably laminated by heat fusion, but fusion proves difficult if the heat resistance of the porous film 20 is less than the heat resistance of the reinforcing member 40. If a material with excellent heat resistance is therefore used as the porous film 20, fusion with the reinforcing member 40 is easily accomplished, and there is a greater degree of freedom in selecting the material of the reinforcing member 40.

In the present invention, since a liquid mixture of a moisture-permeable resin and a solvent is made to penetrate through the reinforcing member 40 and a moisture-permeable resin is formed on the interface 50 between the porous film 20 and the reinforcing member 40, the critical surface tension of the porous film 20 is preferably less than the surface tension of the liquid mixture. If the surface tension of the liquid mixture is greater than the critical surface tension of the porous film 20, the porous film is wetted by the liquid mixture, a greater amount of the moisture-permeable resin penetrates through the interior 21 of the porous film 20, and it is therefore difficult to form the moisture permeable resin layer 30. A fluorine resin is preferably used as the porous film 20, and there is a large degree of freedom in selecting the solvent used to dissolve the moisture-permeable resin because a porous film of a fluorine resin has an extremely low critical surface tension.

Among fluorine resins, a porous film made of stretched polytetrafluoroethylene (PTFE) (hereinafter sometimes referred to as ePTFE film) is preferred. With an ePTFE film, it is possible to increase porosity, and the moisture permeability of the resulting membrane 12 can be increased. Also, extremely small pores can be formed, and the moisture-permeable resin can be prevented from penetrating the interior 21 of the porous film.

The ePTFE film is obtained by molding a paste obtained by mixing a fine powder of PTFE with a molding agent, removing the molding agent from the molded body, and then stretching the molded body at a high temperature and a high speed, and further baking as necessary. The stretching may be either uniaxial stretching or biaxial stretching. A uniaxially stretched porous PTFE film is characterized in that thin island-shaped nodes (folded crystals) substantially orthogonal to the stretching direction are present at the micro level, and that fibrils in a lattice pattern connecting the nodes (straight-chain molecular bundles in which the folded crystals have been dissolved and pulled out by stretching) are oriented in the stretching direction. A biaxially stretched porous PTFE film is characterized on the micro level in that the fibrils extend in a radial pattern, resulting in a fibrous structure in the form of a spider web wherein the nodes connecting the fibrils are interspersed in island shapes and there are multiple spaces segmented by the fibrils and the nodes. It is particularly preferable to use a biaxially stretched porous PTFE film rather than a uniaxially stretched porous PTFE film because widening is easier, the physical balance between the longitudinal direction and the transverse direction is superior, and production cost per unit area is lower.

The average pore diameter of the porous film 20 is about 0.07 to 10 μm, for example. If the average pore diameter is too small, the moisture permeability of the porous film 20 decreases, and the moisture permeable capacity of the membrane 12 therefore decreases as well. Also, if the average pore diameter is too small, the air permeability of the porous film 20 decreases. Therefore, the heat exchange capacity when the membrane 12 is used as a heat exchange film decreases, and the separation efficiency when the membrane is used as a pervaporation film also decreases. An preferable average pore diameter is 0.09 μm or greater. Conversely, if the average pore diameter is too great, it is difficult to form a film 30 made of a moisture-permeable resin because the moisture-permeable resin easily penetrates into the pores 21 of the porous film 20 when the liquid mixture containing the moisture-permeable resin is applied during the manufacture of the membrane 12. A more preferable average pore diameter is 5 μm or less. The term "average pore diameter" of the porous film 20 refers to the average value of the pore diameters as measured using a Coulter Porometer made by Coulter Electronics Ltd. The average pore diameter of the ePTFE film can be appropriately controlled by means of the expansion ratio and the like.

The porosity of the porous film 20 can be appropriately set according to the average pore diameter, and it is recommended that the porosity be about 30% or greater (preferably 50% or greater) and 98% or less (preferably 90% or less), for example. The porosity of the ePTFE film can be appropriately adjusted by means of the expansion ratio and the like, similar to the average pore diameter.

The porosity of the porous film 20 can be calculated based on the following equation, using the mass W of the porous film 20, the bulk density D determined by measuring the apparent volume V that includes the porous area 21 (D=W/V: in units of g/cm³), and the density $D_{standard}$ when no pores 21 are formed at all (2.2 g/cm³ in the case of PTFE resin). The thickness when the volume V is calculated depends on the average thickness measured with a dial thickness gauge (measured using an "SM-1201" made by TECLOCK, without applying a load other than from the mainspring).

$$\text{Porosity (\%)} = [1-(D/D_{standard})] \times 100$$

The air permeability of the porous film 20 is 500 sec or less, and preferably 10 sec or less, for example. If the value of the air permeability is too great, the moisture permeability of the film decreases, and the moisture permeability of the resulting membrane 12 is insufficient. Also, the heat exchange capacity decreases and separating efficiency decreases when the membrane 12 is used as a heat-exchange film or a pervaporation film. The method of measuring the air permeability will be described later.

The thickness of the porous film is not particularly limited, but is preferably about 50 μm or less. If the thickness is too great, the moisture permeating capacity of the membrane 12 decreases. Also, the heat exchange capacity decreases and the separating efficiency decreases when the membrane 12 is used as a heat-exchange film or a pervaporation film. The thickness is even more preferably 20 μm or less. The thickness is also preferably 1 μm or greater because workability is compromised if the film is too thin. The thickness is more preferably 2 μm or greater.

The reinforcing member 40 is not particularly limited as long as it can reinforce the porous film 20 and has openings (air permeability) to an extent that does not block the treated fluid (external air or the like to be subjected to heat exchange or moisture exchange, for example) from the moisture-permeable resin layer 30, and the porosity of the reinforcing member 40 is about 30 to 95%, for example. If the porosity is too small, then when the membrane 12 is manufactured, the liquid mixture has difficulty penetrating the reinforcing member 40 when the liquid mixture containing the moisture-permeable resin is applied from the reinforcing member 40 side, and it also becomes difficult to form the moisture-permeable resin layer 30 on the side of the interface 50 with the porous film 20. The porosity is more preferably 40% or greater. However, if the porosity is too great, the strength is likely to be insufficient. The porosity is also more preferably 90% or less. The porosity of the reinforcing member 40 can be determined in a similar manner to that of the porous film 20.

The reinforcing member 40 is normally formed from a fibrous resin. Using a fibrous resin makes it possible to easily manufacture a reinforcing member 40 with a specific porosity. The reinforcing member 40 formed from a fibrous resin may be woven fabric, knit, non-woven fabric (for example, nonwoven fabric formed by thermal bonding, spun bonding, or other such methods), or netting. Nonwoven fabric is particularly preferred for the reinforcing member 40. The nonwoven fabric has tiny openings composed of multiple fibers (the gaps between the fibers), and therefore has excellent effects of sustaining the moisture-permeable resin.

If a thermoplastic resin is used as the fibrous material, there is no need to use an adhesive because the fibrous material can be bonded with the porous film 20 by heat fusion. If an adhesive is used to bond the porous film 20 with the reinforcing member 40, since volatile components are contained in the adhesive, these components are volatilized when the membrane 12 is used, and it is possible that this will have adverse effects on people. Such problems can be avoided if the reinforcing member 40 and the porous film 20 are bonded by heat fusion. Particularly, in the membrane 12 of the present invention, since multiple pores 21 are formed in the porous film 20 bonded with the reinforcing member (resin) 40, the adhesiveness between the porous film 20 and the reinforcing member 40 can be significantly increased as a result of part of the melted resin penetrating through the pores 21 of the porous film when the reinforcing member (resin) 40 is heat fused.

For the aforementioned resin, it is recommended that a resin be used that has a lower melting point or softening point than the melting point or softening point of the porous film 20. Using a resin with a lower melting point (or a lower softening point) than the melting point or softening point of the porous film makes it possible to heat-fuse the reinforcing member 40 to the porous film 20.

It is recommended that the fibers forming the reinforcing member 40 be used by combining a low-melting resin and a high-melting resin. If a low-melting resin is used alone, the moisture permeability may decrease and wrinkles may occur as a result of the excessive melting of the resin melting and the formation of a dense film. Combining a high-melting resin makes it possible to prevent the formation of a resin film and to avoid the occurrence of the aforementioned problems. Furthermore, when the membrane 12 is subjected to corrugating or another such deforming process in order to increase the surface area, if the reinforcing member 40 is formed from a low-melting resin and a high-melting resin, the shape is easily attained during deformation due to the action of the low-melting resin, and the shape is easily maintained due to the action of the high-melting resin.

The term "high-melting resin" refers to a resin with a higher melting point than the low-melting resin. The difference in melting points is 10° C. or greater, and preferably 20° C. or greater, for example. The melting points of the resins are the values measured with a differential heat scanning calorimeter (DSC; SSC/5200 made by Seiko Electronic Industries). Depending on the resin, a clear melting point might not be exhibited, and a softening point is used for a resin that does not exhibit a clear melting point. The value measured by the Vicat method according to JIS K7206 is used as the softening point.

When a low-melting resin and a high-melting resin are combined, a fiber mixture containing a mixture of a low-melting resin fiber and a high-melting resin fiber may be used. For example, a fiber mixture with a separable structure may be used in which the fibers comprising the low-melting resin cover the peripheries of the fibers configured from the high-melting resin, or fibers that are integrally molded from both the low-melting resin and the high-melting resin may be used. Possible examples of such integrated fibers are fibers with a core-sheath structure in which the periphery of the high-melting resin is covered by the low-melting resin.

A resin with low hygroscopicity is recommended as the aforementioned resin. With a higher hygroscopicity, the strength decreases during condensation, and the membrane 12 is more likely to deform or tear. Possible examples of resins with low hygroscopicity include acryl-based resins, nylon-based resins, vinylon-based resins, polyester-based resins, polylactic acid-based resins, polyolefin-based resins, and the like. When a flame retardant (described later) is used, it is difficult to fix the flame retardant in place because the polyolefin-based resin has a high surface energy. Therefore, when a flame retardant is used, resins other than those of a polyolefin base (for example, acryl-based resins, nylon-based resins, vinylon-based resins, polyester-based resins, polylactic acid-based resins, and the like) can be appropriately used.

When manufacturing the membrane 12 of the present invention, it is vital to appropriately set the critical surface tension $\gamma_{c2}$ of the reinforcing member 40 and the critical surface tension $\gamma_{c1}$ of the porous film 20 in advance. The reasons for this will be described later, but the difference between $\gamma_{c2}$ and $\gamma_{c1}$ ($\gamma_{c2}-\gamma_{c1}$) is −5 mN/m or greater, preferably 0 mN/m or greater, more preferably 5 mN/m or greater, and even more preferably 10 mN/m or greater, for example.

The thickness of the reinforcing member 40 is not particularly limited, but is about 5 μm or greater (preferably 10 μm or greater) and 1000 μm or less (preferably 500 μm or less), for example. If the thickness of the reinforcing member 40 is too great, the moisture permeating capacity of the membrane 12 decreases, and the apparatus (heat exchanger, humidifier, dehumidifier, or the like) that uses this membrane 12 increases in size. The heat exchange capacity decreases when the membrane 12 is used as a heat-exchange film. On the other hand, if the thickness of the reinforcing member 40 is too small, the workability of the membrane 12 is compromised.

The moisture-permeable resin layer 30 is a layer in the form of a nonporous film made of a moisture-permeable resin, and is a portion that allows heat and moisture (water vapor) but not air to pass through. The layer functions as a membrane. A water-insoluble moisture-permeable resin may be used, but a water-soluble resin can also be used because the membrane 12 of the present invention has increased condensation resistance.

A possible example of a water-insoluble moisture-permeable resin is polyurethane. Possible examples of the moisture-permeable resin include polyvinyl alcohol, polyethylene oxide, polyacrylic acid, and the like. Polyvinyl alcohol in particular is inexpensive and is in high demand for practical application, but practical application thereof is difficult with conventional membranes in terms of condensation resistance, as described above. According to the present invention, however, condensation resistance can be improved even when a water-soluble resin such as polyvinyl alcohol is used, which is extremely useful. The moisture-permeable resin may also be cross-linked. If the moisture-permeable resin is crosslinked, moisture-permeable resin layer becomes dense, and the water resistance (condensation resistance) of the moisture-permeable resin layer can be further increased.

The thickness of the moisture-permeable resin layer 30 is not particularly limited as long as the functions described above can be exhibited, and is about 0.2 to 5 µm, for example. If the thickness is too low, pinholes are likely to form. The thickness is more preferably 0.5 µm or greater. On the other hand, if the thickness is too great, moisture permeability is likely to decrease. The thickness is more preferably 3 µm or less.

The moisture-permeable resin layer (moisture-permeable resin film) 30 is formed on the side of the interface 50 with the porous film in the reinforcing member 40. When the membrane 12 is manufactured by the method of the present invention described later, a moisture-permeable resin that has not formed into a layer is dispersed in the portions of the reinforcing member 40 on which the moisture-permeable resin layer (moisture-permeable resin film) 30 is not formed.

The moisture-permeable resin layer 30 preferably contains a flame retardant. This is because including a flame retardant makes it possible to increase the flame resistance of the moisture-permeable resin layer 30. As a result, the flame resistance of the entire membrane 12 can be increased. When the membrane 12 is manufactured by the method of the present invention described later, the flame retardant is dispersed on the portions of the reinforcing member 40 on which the moisture-permeable resin layer (moisture-permeable resin film) 30 is not formed, enhancing the flame resistance of the entire reinforcing member 40. As a result, the flame resistance of the entire membrane 12 can be even further increased.

The type and weight of the flame retardant is not particularly limited, and can be appropriately set according to the grade of the flame retardant required. It is preferable to use a non-halogen based flame retardant in view of the environmental impact. More specifically, an aromatic ester phosphate-based flame retardant, a guanidine phosphate-based flame retardant, an alicyclic ester phosphate-based flame retardant, or the like can be used. An aromatic ester phosphate-based flame retardant is insoluble in water and is absorbed by the fibers when heated at a temperature equal to or greater than the glass transition temperature of the fibrous resin constituting the reinforcing member 40. Therefore, such a retardant does not elute when in contact with condensed water or the like, and can be expected to have stable flame retarding effects. A guanidine phosphate-based flame retardant or an alicyclic ester phosphate-based flame retardant absorbs water, and can therefore be expected to have an absorbent effect. The entire membrane 12 often requires third degree flame retardancy as stipulated in JIS Z2150, or VTM-second degree flame retardancy as stipulated in UL94.

The moisture-permeable resin layer 30 may also contain an absorbent. If an absorbent is included, the amount of moisture retained by the moisture-permeable resin layer 30 can be increased, and moisture permeability can be further increased. A water soluble salt can be used as the absorbent. Specifically, a lithium salt or phosphoric acid salt or the like can be used.

The air permeability of the membrane (laminated article) 12 of the present invention is about 3000 sec or greater, for example. If the air permeability is too low, the fluid isolated by the membrane may be mixed in. The upper limit of the air permeability is not particularly limited, and zero air permeability is also acceptable. The term "air permeability" refers to the Gurley number. The term "Gurley number" refers to the time required for 100 cm$^3$ of air to flow over an area of one square inch (6.45 cm$^2$) at a pressure of 1.23 kPa.

The moisture permeability of the membrane (laminated article) 12 of the present invention is 3000 g/m$^2$/24 hr or greater, for example. If the moisture permeability is too low, the penetration of water vapor is insufficient, and moisture aggregates and condenses on the surface of the membrane 12, causing film deterioration. The moisture permeability is more preferably 10,000 g/m$^2$/24 hr or greater. The moisture permeability should be as high as possible, and has no upper limit. The moisture permeability is the value measured in conformity with JIS L1099 (method B-1).

Next, the method for manufacturing the membrane 12 according to the present invention will be described. In the manufacturing method of the present invention, after the porous film 20 and the reinforcing member 40 are laminated to form the a laminated article 23, a liquid mixture of a moisture-permeable resin and a solvent is applied from the side of the laminated article 23 with the reinforcing member 40, and the solvent is then evaporated. Thus, the liquid coating is kept on the surface of the porous film 20, a moisture-permeable resin layer 30 can be easily formed on the interface, and the membrane 12 can be manufactured in an extremely simple manner.

The liquid mixture of the moisture-permeable resin and the solvent is either a solution or an emulsion, and a water-based solvent is normally used. The term "water-based solvent" refers to either water alone or a solvent mixture of water and another solvent, and possible examples of the other solvent include alcohols (methanol or ethanol or the like), ketones (acetone or the like), ethers (tetrahydrofuran or the like), nitrites (acetonitrile or the like), and other solvents readily miscible with water. When the moisture-permeable resin is insoluble in water, the resin is applied after being emulsified in order to make the formation of the film easier.

In the step of applying the liquid mixture of the moisture-permeable resin and the solvent, the wetting properties of the liquid mixture are an important factor. Specifically, if the wetting properties of the liquid mixture (liquid coating) in relation to the porous film 20 are too high, the liquid coating penetrates through the porous film 20, the liquid coating cannot be kept on the surface of the porous film 20, and, consequently, the moisture-permeable resin layer (moisture-permeable resin film) 30 cannot be formed. Also, if the wetting properties of the liquid mixture (liquid coating) in relation to the reinforcing member 40 are too low, the liquid mixture forms droplets that adhere to the reinforcing member 40, and the moisture-permeable resin therefore cannot form a layer (film) when the solvent is evaporated. Therefore, the liquid mixture (liquid coating) requires low wetting properties in relation to the porous film 20, and, conversely, high wetting properties in relation to the reinforcing member 40.

The wetting properties can be set on the basis of the critical surface tension $\gamma_c$ of the resin constituting the porous film 20 or the reinforcing member 40. The critical surface tension $\gamma_c$ is an index proposed by Zisman as an estimate of the surface free energy (the energy needed to increase the unit surface area) (Kitahara: Basics of Interface-Colloid Chemistry, Chapter 8 "Wetness," Koudansha, 1994). In order for a liquid (liquid coating) to entirely wet the surface of a solid (reinforcing member or the like) (with a contact angle of 0 degrees), the surface tension $\gamma$ of the liquid (liquid coating) must be less than the critical surface tension $\gamma_{c2}$ of the solid (reinforcing member or the like) ($\gamma_{c2} > \gamma$; Eq. A1), and, conversely, in order for a liquid (liquid coating) to not entirely wet the surface of a solid (porous film or the like), the surface tension γ must be greater than the critical surface tension $γ_{c1}$ of the solid (porous film or the like) ($γ>γ_{c1}$; Eq. B1).

However, even if the liquid coating does not actually entirely wet the reinforcing member 40, since the holed parts of the reinforcing member 40 (gaps between the fibers) are relatively large, the liquid coating can penetrate into the reinforcing member 40, making it possible to form the moisture-permeable resin layer 30. If the wetting properties of the liquid coating in relation to the reinforcing member 40 are poor, the liquid coating does not penetrate uniformly, and the moisture-permeable resin layer 30 is subject to pinholes and other such drawbacks. Because of this, it is still possible to form the moisture-permeable resin layer 30 even if the liquid coating has a high surface tension γ up to a specific value a in comparison with the critical surface tension $γ_{c2}$ of the reinforcing member 40 (a is about 10 mN/m, or preferably about 5 mN/m, for example). Specifically, it is possible to form the moisture-permeable resin layer 30 in a range in which the relationship $γ_{c2}+a≧γ$ (Eq. A2) is satisfied. On the other hand, Eq. B1 is corrected if actual phenomena are taken into account in the relationship with the porous film 20. Specifically, the liquid coating sometimes continues to penetrate into the porous film 20 due to the capillary phenomenon even when the liquid coating does not entirely wet the porous film 20. Therefore, taking the capillary phenomenon into consideration, the surface tension γ of the liquid coating must be greater than the critical surface tension $γ_{c1}$ of the porous film 20 by a specific value b or greater ($γ≧γ_{c1}+b$; Eq. B2). Here, b is a value characteristic of the porous film that varies according to the average pore diameter or the like of the porous film 20, and is about 5 mN/m, or preferably 10 mN/m, for example.

Combining Eqs. A2 and B2 results in $γ_{c2}+a≧γ_{c1}+b$, which can be rearranged as follows:

$$γ_{c2}-γ_{c1}≧b-a \qquad \text{(Eq. C)}$$

Eq. C shows the relationship between the critical surface tension $γ_{c2}$ of the reinforcing member 40 and the critical surface tension $γ_{c1}$ of the porous film 20, and when a liquid mixture is applied to manufacture the membrane 12, as in the manufacturing method of the present invention, it needs to be performed based on an assumption that the critical surface tension $γ_{c2}$ of the reinforcing member 40 and the critical surface tension $γ_{c1}$ of the porous film 20 must satisfy the relationship in Eq. C. When the liquid coating is prepared, the surface tension γ of the liquid coating must be adjusted so as to satisfy the relationship in Eqs. A2 and B2.

The preferred ranges of Eqs. C, A2, and B2 are shown below.

Eq. C:

for example, $γ_{c2}-γ_{c1}≧-5$ mN/m (when a=10 mN/m, b=5 mN/m)

preferably, $γ_{c2}-γ_{c1}≧0$ mN/m (when a=5 mN/m, b=5 mN/m; or when a=10 mN/m, b=10 mN/m)

more preferably, $γ_{c2}-γ_{c1}≧5$ mN/m (when a=5 mN/m, b=10 mN/m)

particularly, $γ_{c2}-γ_{c1}≧10$ mN/m

Eq. A2:

for example, $γ≦γ_{c2}+10$ mN/m preferably, $γ≦γ_{c2}+5$ mN/m more preferably, $γ≦γ_{c2}$ Eq. B2:

for example, $γ≧γ_{c1}+5$ mN/m preferably, $γ≧γ_{c1}+10$ mN/m more preferably, $γ≧γ_{c1}+15$ mN/m The critical surface tensions $γ_c$ of common materials (unit: mN/m) are given in E. G. Shafrin, Polymer Handbook 2nd Ed. (J. Brandrup, E. H. Immergut ed.), John Wiley, New York, 1975, p-III/221. Therefore, the relationship in Eq. C can be easily satisfied if the materials of the reinforcing member 40 and porous film 20 are selected by taking these values into account. The critical surface tensions of primary materials are shown in Table 1 below. If the reinforcing member 40 and porous film 20 are formed from materials whose critical surface tensions $γ_c$ are not known, smooth sheets formed from these materials (smooth sheets whose effects on measurements are sufficiently small) can be used to determine the critical surface tensions $γ_c$ of the materials by using a Zisman plot.

TABLE 1

| Type | Critical surface tension Yc (mN/m) |
| --- | --- |
| Polytetrafluoroethylene (PTFE) | 18 |
| Polypropylene (PP) | 29 |
| Polyethylene (PE) | 31 |
| Polystyrene (PS) | 33 |
| Vinylon | 37 |
| Polyvinyl chloride (PVC) | 39 |
| polyethylene Terephthalate (PET) | 43 |
| Nylon | 46 |

The surface tension γ (unit: mN/m) of the liquid mixture (liquid coating) of the moisture-permeable resin and the solvent can be measured by the Wilhelmy method, and an automatic surface tension gauge CBVP-Z made by Kyowa Interface Science Co., Ltd. may be used for this measurement. The surface tension γ of the liquid mixture (liquid coating) can be adjusted by appropriately setting the concentration of the moisture-permeable resin or the solvent used. A surfactant or the like may also be used as necessary.

The wetting properties between the liquid mixture (liquid coating) and the reinforcing member 40 and between the liquid mixture (liquid coating) and the porous film 20 can be appropriately controlled as described above. The angle of contact between the liquid mixture and the reinforcing member 40 is about 90° or less (preferably about 45° or less), for example, and when the liquid mixture is applied from the side of the reinforcing member 40, the liquid mixture easily penetrates into the reinforcing member 40, and the moisture-permeable resin layer 30 can easily be formed without the liquid mixture forming into droplets. On the other hand, if the angle of contact between the liquid mixture and the porous film 20 is about 10° or greater (preferably 30° or greater), for example, then the liquid mixture can be prevented from continuing to penetrate the porous film 20, and the moisture-permeable resin layer 30 can be formed on the interface 50 between the reinforcing member 40 and the porous film 20. The angle of contact between the liquid mixture and the porous film 20 is about 90° or less, for example. If the angle of contact is too great, the liquid mixture bounces off the surface of the porous film 20, and the moisture-permeable resin layer 30 tends to form pinholes and the like.

A flame retardant may be added as necessary to the liquid mixture. Applying a liquid coating containing a flame retardant from the side of the reinforcing member 40 makes it possible to form the moisture-permeable resin layer 30 with one operation, and to provide the moisture-permeable resin layer 30 with flame retardancy. Therefore, the flame retardancy of the membrane 12 can be increased in a simple manner.

Also, mixing a cross-linking agent into the liquid coating in advance makes it simpler to cross-link the moisture-permeable resin makes it simpler to mix a cross-linking agent into the liquid coating in advance. Examples of the cross-linking agent include a liquid mixture of glutaraldehyde and HCl, formaldehyde, blocked isocyanate, or the like.

The applied solvent may be evaporated either at atmospheric pressure or reduced pressure, but vigorous evaporation causes holes to form in the moisture-permeable resin layer 30, and therefore the solvent must be evaporated under conditions that do not create such defects in the moisture-permeable resin layer 30. In the manufacturing method of the present invention, an adhesive may be used to bond the porous film 20 and the reinforcing member 40, but if an adhesive is used, the air permeability of the porous film 20 may decrease, which may be harmful to operators as described above. Therefore, it is recommended that the porous film 20 and the reinforcing member 40 are heat-fused without the use of an adhesive. The porous film 20 and the reinforcing member 40 are preferably heat-fused at the stage when the porous film 20 and the reinforcing member 40 are laminated before the liquid mixture is applied.

During heat fusion, the heating temperature of the reinforcing member 40 is equal to or greater than the melting point (or the softening point when no melting point is displayed; the same applies hereinbelow) of the resin constituting the reinforcing member 40 (low-melting resin when a low-melting resin and a high-melting resin are used together), and is preferably equal to or greater than the melting point (or the softening point)+10° C. It is recommended that the heating temperature do not exceed 50° C. over the melting point of the resin constituting the reinforcing member 40 (low-melting resin when a low-melting resin and a high-melting resin are used together), or preferably be equal to the melting point +40° C. or less. If the heating temperature is too high, the resin melts excessively, the reinforcing member 40 becomes dense, the moisture permeability of the membrane 12 decreases, and the liquid coating containing the moisture-permeable resin has difficulty penetrating into the reinforcing member 40.

The membrane 12 of the present invention can be manufactured in an extremely simple manner by the method described above. The membrane 12 of the present invention has excellent condensation resistance and peeling resistance, and therefore can be suitably used in heat-exchange films (for example, heat-exchange films for air conditioners), humidifying films, dehumidifying films, pervaporation films (for example, separating films used to separate water and ethanol), and the like.

A heat exchanger is described as one example of an application for the membrane 12. The structure of the heat exchanger is not particularly limited, but one structural example is described using the diagrams.

In FIG. 4, the reference numeral 1 indicates a separator, 12 a membrane used as a heat-exchange film, 3 the flow of discharged air, and 4 the flow of suctioned air. The separator 1 has a wave shape and is laminated alternately with the membrane 12. The waveform direction of the separator 1 at this time is oriented so as to be orthogonal to the waveform direction of the adjacent separator 1. As a result of this orthogonal arrangement, flow channels can be formed for discharged air and suctioned air.

For example, when the discharged air 3 is air that has been warmed and humidified in a heated room, and suctioned air 4 is cold and dry outdoor air, heat and moisture are exchanged via the membrane 12 when the air 3, 4 passes through the flow channels formed by the separator 1 and the membrane 12. As a result, the suctioned air 4 is warmed and suctioned into the heating chamber in a humidified state. Therefore, the heating efficiency in the heating chamber increases, and the moisture of the air in the chamber can be adjusted.

The present invention is described in further detail below with reference to embodiments; however, the present invention shall not be construed to be limited to the embodiments hereunder, and may indeed be implemented through suitable modification within the scope applicable to the essence described hereinbelow or hereinabove, with all such modifications being included within the technical purview of the invention.

WORKING EXAMPLE 1

A membrane 12 having the structure shown in FIG. 3 was manufactured in the manner described hereunder.

An expanded porous PTFE film: manufactured by Japan Gore-Tex; average pore diameter: 0.1 µm; porosity: 87%, thickness: 5 µm; air-permeability: 3 sec) was used as the porous film 20.

A non-woven fabric (P08040 manufactured by Mie Tech; mass weight 40 g/m$^2$; porosity: 65%; thickness: 120 µm) was used as a reinforcing member 40. The non-woven fabric was processed into the form of a sheet with a thermal bonding technique using short fibers having a core-sheath structure (MELTY manufactured by Unitika Fiber); sheath: polyethylene terephthalate, melting point: 110° C.; core: polyethylene terephthalate, melting point: 261° C.; average fiber thickness: 3 denier). The difference $\gamma_{c2}-\gamma_{c1}$ between the critical surface tension of the resin forming the reinforcing member 1 (sheath: polyethylene terephthalate) ($\gamma_{c2}$) and the critical surface tension of the resin forming the porous film 1 (PTFE) ($\gamma_{c1}$) was 43-18=25 mN/m.

Mixed solution A was prepared by dissolving polyvinyl alcohol (Poval PVA217 manufactured by Kuraray; degree of saponification: 87 to 89%; degree of polymerization: 1700) as moisture-permeable resin in water to reach a concentration of 3 mass %. An aromatic phosphate flame retardant (HF-77 manufactured by Nicca Chemical) and a guanidine phosphate flame retardant (P-207S manufactured by Nicca Chemical) were added to mixed solution A as phosphoric add-based flame retardants so that the concentration of each reached 3 mass % and 10 mass %, respectively. A blocked isocyanate (Meikanate MF manufactured by Meisei Chemical Works) was added as a crosslinking agent so that the concentration thereof reached 3.5 mass %. The surface tension of the mixed solution A, which was measured with the Wilhelmy method, was 39.4 mN/m. The surface tension measurements were performed with an automatic surface tensometer manufactured by Kyowa Interface Science (CBVP-Z)

The porous film 20 was heat-fused to the reinforcing member 40 at 140° C. so as to laminate them together, and a wire bar was used to apply the mixed solution A from the reinforcing member 40 side of the resulting laminated article 23 (coated amount: 95 g/m$^2$). A heat treatment was performed for one minute at a temperature of 150° C. and for a further two minutes at a temperature of 180° C.; the solvent (water) was evaporated off, resulting in a membrane 12 (amount of coating in the solids portion: 10 g/m$^2$). The moisture-permeable resin layer 1 was cross-linked by the heating.

A moisture-permeable resin layer (moisture-permeable resin membrane) 30 was formed in the membrane 12 on the interface on the porous film 20 side of the reinforcing member 40.

COMPARATIVE EXAMPLE 1

The membrane 13 of the structure shown in FIG. 5 was manufactured as described hereunder. In other words, the membrane 13 was obtained in the same manner as in Working Example 1, with the exception that a wire bar was used to apply the mixed solution A from the side of the porous film 20 of the laminated article 23 consisting of the porous film 20 and the reinforcing member 40. As shown in FIG. 5, the membrane 13 had a three-layered structure: moisture-permeable resin layer (moisture-permeable resin membrane) 30/porous film 20/reinforcing member 40.

COMPARATIVE EXAMPLE 2

A membrane 11 of the structure shown in FIG. 2 was manufactured as described hereunder.

Mixed solution B, which was obtained by mixing a potyurethane resin (Hypol 2000, manufactured by Dow Chemical) and ethylene glycol at an NCO/OH equivalent ratio of 1.2, was applied on a surface of the same porous film 20 used in Working Example 1; after which drying was performed for five minutes at 100° C. A wet-heat treatment was then performed for 60 min at 100° C. and a relative humidity (RH) of 80%, resulting in a composite membrane 25 composed of a polyurethane resin layer (moisture-permeable resin layer) 30 formed on one side of the porous film 20.

A spunbond non-woven fabric from Unitika Ltd. (ELVES); coating weight: 30 g/m$^2$) was used as the reinforcing member 40. The Elves product is a non-woven fabric formed from short fibers in a core-sheath structure (sheath: polyethylene, melting point 120° C.; core: polyethylene terephthalate, melting point 261° C.), and has a thickness of 150 μM and a porosity of 80%.

A membrane 11 was obtained by heat-fusing the reinforcing member 40 to the polyurethane resin layer 30 side of the composite membrane 25 at 150° C. to laminate them together.

The membrane 11 had a three-layer structure: reinforcing member 40/moisture-permeable resin layer (moisture-permeable resin membrane) 30/porous film 20. None of the moisture-permeable resin was observed to have penetrated into the interior of the reinforcing member 40.

COMPARATIVE EXAMPLE 3

A membrane 11 of the structure shown in FIG. 2 was manufactured as described hereunder.

The mixed solution A was applied on a surface of the same porous film 20 used in Working Example 1. A heat treatment was performed for one minute at 150° C. and for a further two minutes at 180° C.; the solvent (water) was evaporated off, resulting in a composite membrane 25 having a moisture-permeable resin layer 30 on one side of the porous film 20. The moisture-permeable resin layer 30 was cross-linked by the heating.

The reinforcing member 40 was the same one used in Working Example 1.

A membrane 11 was obtained by heat-fusing the reinforcing member 40 to the polyurethane resin layer 30 side of the composite membrane 25 at 150° C. to laminate them together. As shown in FIG. 2, the membrane 11 has a three-layer structure: reinforcing member 40, moisture-permeable resin layer (moisture-permeable resin membrane) 30, and porous film 20. None of the moisture-permeable resin was observed to have penetrated into the interior of the reinforcing member 40

The membranes 11 through 13 obtained in the working and comparative examples above were measured, as described hereunder, in regard to the adhesion between the porous film 20 and the reinforcing member 40, as well as to their air-permeability, moisture-permeability, and flame retardancy.

The porous film 20 and reinforcing member 40 were peeled apart, and the adhesion was measured with the 180° method. In other words, the membranes 11 through 13 obtained in the working and comparative examples above were cut into test pieces 30 mm in width and 100 mm in length. The porous film 20 and reinforcing member 40 of the test pieces were peeled apart approximately 15 mm from an end in a lengthwise direction, the ends of the porous film side and reinforcing member side of the peeled parts were placed in chucks, and these were peeled apart in a 180° direction at a pulling rate of 200 mm/min to obtain the average stress value. The measurements were performed with an Autograph AGS-100A manufactured by Shimadzu.

The air-permeability of the membranes 11 through 13 was measured with an Oken-type air-permeability tester manufactured by Asahi Seiko (KG1).

The moisture-permeability of the membranes 11 through 13 was measured according to JIS L1099 (B-2).

The flame retardancy of the membranes 11 through 13 was assessed according to the flammability test (VTM) specified under UL94.

The thickness of the moisture-permeable resin layers formed in the membranes 11 through 13 was measured with a scanning electron microscope (SEM) at a 1000-times magnification The results are displayed in Table 2.

TABLE 2

| | Peeling strength (kg/3 cm) | Air-permeability (sec) | Moisture-permeability (g/m$^2$/24 hr) | Flame retardancy | Thickness of moisture-permeable resin layer (μm) |
|---|---|---|---|---|---|
| Working Example 1 | 0.2 | ≧3000 | 89685 | VTM-0-compliant | 1.1 |
| Comparative Example 1 | 0.2 | ≧3000 | 87560 | Ignited from non-woven fabric surface Non-compliant with VTM-2 | 1.0 |
| Comparative Example 2 | 0.01 | ≧3000 | 53353 | Flames spread Non-compliant with VTM-2 | 10 (polyureth. layer) |
| Comparative Example 3 | 0.01 | ≧3000 | 85000 | Flames spread Non-compliant With VTM-2 | 10 (PVA layer) |

As is evident from Table 2, the membrane 12 obtained in Working Example 1 (refer to FIG. 3) had the reinforcing member 1 laminated directly to the porous film 1, which resulted in high peeling strength and exceptional adhesion. In contrast, the membrane 11 obtained in Comparative Example 2 or 3 (refer to FIG. 2) had the porous film and reinforcing member laminated with a moisture-permeable resin layer interposed therebetween, which resulted in low peeling strength and adhesion.

Membranes 11 through 13 all exhibited air-permeability of 3000 see or higher, and were able to continuously exhibit low air-permeability. All had good moisture-permeability except for that in Comparative Example 2, which was provided with a polyurethane layer 30.

The membrane 12 obtained in Working Example 1 (refer to FIG. 3) showed improved flame retardancy as a result of a flame retardant being contained in the moisture-permeable resin layer 30 within the reinforcing member 40. In contrast, the membrane 13 obtained in Comparative Example 1 (refer to FIG. 5) had a moisture-permeable resin layer 30 provided to a surface opposite that of the reinforcing member 40, with the porous film 20 interposed therebetween; as a result, there was no improvement in the flame retardancy of the non-woven fabric, and burning proceeded from the non-woven fabric side.

The anti-condensation properties of the membranes 11 through 13 were subsequently evaluated. The anti-condensation properties were evaluated according to the change in mass before and after water was flushed over the surface of the moisture-permeable resin layer.

The membranes were tilted to an approximately 15° angle of elevation, with the reinforcing member 40 being uppermost in the membrane 12 obtained in Working Example 1 (refer to FIG. 3), the moisture-permeable resin layer 30 being uppermost in the membrane 13 obtained in Comparative Example 1 (refer to FIG. 5), and the reinforcing member 40 being uppermost in the membranes 11 obtained in Comparative Examples 2 and 3 (refer to FIG. 2). Water was continuously flushed over the surfaces of the membranes 11 through 13 at a rate of 30 mL/min. Measurements of the mass were performed after 15 hrs, and the change in mass before and after the water flushing were calculated.

As with the membrane in Comparative Example 2, in which the moisture-permeable resin layer 30 had been formed from a non-water-soluble polyurethane resin, the membrane 12 obtained in Working Example 1 exhibited no change in mass, despite the moisture-permeable resin layer 30 having been formed from a water-soluble resin (polyvinyl alcohol), and had highly exceptional anti-condensation properties. Therefore, even if condensation forms on the membrane 12, the egress of the moisture-permeable resin or the like can be suppressed. In contrast, a change in mass of approximately 2% was observed in the membrane 13 obtained in Comparative Example 1. In the membrane 11 obtained in Comparative Example 3, the porous film 20 and reinforcing member 40 ended up peeling during the measurements, and the change in mass before and after the water flushing could not be calculated.

While particular embodiments of the present invention have been illustrated and described herein, the present invention should not be limited to such illustrations and descriptions. It should be apparent that changes and modifications may be incorporated and embodied as part of the present invention within the scope of the following claims.

We claim:

1. A membrane which is a laminated article of a porous film adjacent to a reinforcing member, characterized in that said reinforcing member has internally disposed therein a moisture-permeable resin layer, situated on the side of interface with said porous film.

2. A membrane according to claim 1 wherein mean pore size of said porous film is 0.07 to 10 µm, and porosity of said reinforcing member is 30 to 95%.

3. A membrane according to claim 1 or 2 wherein said moisture-permeable resin is water-soluble.

4. A membrane according to claim 3 wherein said water-soluble, moisture-permeable resin is polyvinyl alcohol.

5. A membrane according to claim 1 wherein the difference ($\gamma_{c2} - \gamma_{c1}$) between the critical surface tension $\gamma_{c2}$ of said reinforcing member and the critical surface tension $\gamma_{c1}$ of said porous film is −5 mN/m or above.

6. A membrane according to claim 1 wherein said moisture-permeable resin layer contains a flame retardant.

7. A membrane according to claim 1 wherein said moisture-permeable resin layer contains a hygroscopic agent.

8. A membrane according to claim 1 wherein said reinforcing material is composed of fibrous resin.

9. A membrane according to claim 8 wherein said fibrous resin is a nonwoven fabric.

10. A membrane according to claim 8 wherein said fibrous resin is composed of fibers of core-sheath structure, with the melting point of the resin constituting the sheath portion being lower than the melting point of the resin constituting the core portion.

11. A membrane according to claim 1 wherein said porous film is composed of polytetrafluoroethylene.

12. A membrane according to claim 1 having air permeability of 3000 sec or higher.

13. A membrane according to claim 1 having moisture permeability of 3000 g/m$^2$/24 hr or higher.

14. A method for making a membrane, characterized in that after laminating a porous film and a reinforcing material, a mixed solution of moisture-permeable resin and solvent is applied from said reinforcing material side, and said solvent is then evaporated out.

15. A heat exchanger characterized in that the heat exchange membrane is composed of a membrane according to any one of claims 1 to 13.

* * * * *